(12) United States Patent
Espen

(10) Patent No.: US 7,629,535 B2
(45) Date of Patent: Dec. 8, 2009

(54) ELECTRIC SUBMARINE POWER CABLE AND SYSTEM FOR DIRECT ELECTRIC HEATING

(75) Inventor: Olsen Espen, Halden (NO)

(73) Assignee: Nexans, Paris (FR)

( * ) Notice: Subject to any disclaimer, the term of this patent is extended or adjusted under 35 U.S.C. 154(b) by 274 days.

(21) Appl. No.: 11/703,523

(22) Filed: Feb. 7, 2007

(65) Prior Publication Data

US 2007/0237469 A1 Oct. 11, 2007

(30) Foreign Application Priority Data

Feb. 17, 2006 (NO) .................................. 20060760

(51) Int. Cl.
*H01B 7/18* (2006.01)
(52) U.S. Cl. .................. 174/102 R; 174/108
(58) Field of Classification Search ............ 174/102 R, 174/105 R, 78, 120 SC; 166/248; 392/301
See application file for complete search history.

(56) References Cited

U.S. PATENT DOCUMENTS

| | | | | |
|---|---|---|---|---|
| 4,349,694 | A | | 9/1982 | Vives ...................... 174/128.1 |
| 6,417,457 | B1 | * | 7/2002 | Aasbo et al. ............. 174/120 R |
| 7,085,457 | B2 | * | 8/2006 | Lancaster et al. ........... 385/101 |
| 7,285,726 | B2 | * | 10/2007 | Bremnes ................. 174/102 R |
| 7,381,900 | B2 | * | 6/2008 | Bremnes et al. ......... 174/102 R |
| 2002/0122664 | A1 | | 9/2002 | Mjelstad et al. ............. 392/478 |
| 2004/0060726 | A1 | * | 4/2004 | Orlet et al. .............. 174/120 R |

FOREIGN PATENT DOCUMENTS

| | | | |
|---|---|---|---|
| EP | 0614197 | | 2/1994 |
| EP | 1 686 301 A1 | * | 2/2006 |
| GB | 740647 | | 9/1954 |
| GB | 833004 | | 12/1957 |
| GB | 2 352 082 A | * | 1/2001 |
| GB | 2425219 | | 10/2006 |

OTHER PUBLICATIONS

UK Search Report- Jun. 4, 2007.

* cited by examiner

*Primary Examiner*—William H Mayo, III
(74) *Attorney, Agent, or Firm*—Sofer & Haroun, LLP

(57) ABSTRACT

An electric submarine power cable, in particular for use in hydrocarbon pipeline heating systems and adapted to be installed as a piggyback cable on the pipelines, having a multi-wire stranded conductive core with an outer insulation and at least one outer protective sheath as well as armoring means. The armoring means are incorporated in the conductive core as integral tensile strength wire elements. Moreover, a hydrocarbon pipeline heating system as such, having this submarine power cable.

11 Claims, 1 Drawing Sheet

ELECTRIC SUBMARINE POWER CABLE AND SYSTEM FOR DIRECT ELECTRIC HEATING

RELATED APPLICATION

This application is related to and claims the benefit of priority from Norwegian Patent Application No. 2006 0760, filed on Feb. 17, 2006, the entirety of which is incorporated herein by reference.

FIELD OF THE INVENTION

The present invention in one aspect relates to an electric power cable of a new design, in particular for submarine use in hydrocarbon pipeline heating systems.

BACKGROUND OF THE INVENTION

Electric power cables of various designs for a number of different purposes and applications have been known for a long time. In particular, such cables usually comprise an armouring of a strong material that will contribute substantially to the mechanical strength and protection of the cable. Tensile strength is often essential in this connection, and steel of selected qualities is well known as an armouring material. Such armouring of known cable designs is wound as one or more outer layers in order to protect inner insulation layers and current conductors in the cables.

Whereas the types of cables referred to above are usually designed for being buried in the ground or to be laid on the sea bottom, mention should here also be made of overhead transmission lines that are suspended between masts for carrying very high voltage electric energy over long distances. Such transmission lines are known, where a kind of "armouring" is provided for in the form of a central steel core inside the conductor layers for current transmission, these conductor layers being mostly made of aluminium. Moreover, these high voltage transmission lines are not provided with any insulation layers along their length.

The present invention in one aspect relates to an electric power cable of a new design, in particular for submarine use in hydrocarbon pipeline heating systems and adapted to be installed on said pipelines, comprising a conductive core with an outer insulation and at least one protective sheath as well as armouring means.

The particular purpose of such cables is not comparable to the known cables referred to above, and even much more so when compared to the overhead transmission lines also mentioned above.

For heating of oil or gas pipelines in order to prevent hydrate and ice formation on the pipeline walls, the present applicant has developed a direct electrical heating system that is described, inter alia in British patent specification No. 2.373.321. For current supply to such a heating system a common practice is to install a current supply cable as a so called "piggyback" cable, which is traditionally installed simultaneously with the laying of the pipeline. More specifically such a cable is strapped to the pipeline during installation thereof. For a retrofit installation of a direct electric heating system, however, such simultaneous mounting of the current supply cable is not feasible.

In the case of cable that is piggybacked to the pipeline, the cable cannot have any metallic material such as armouring, outside the insulation layers, since this would make possible an undesired electrical path for return current, hence detracting from the effectiveness of the system. The return current referred to here, should of course as a whole flow through the pipeline walls in order to generate the heating effect aimed at.

The above considerations and in general the fact that installation and dynamic operation of deep sea power cables involve strict demands on the strength and bending properties of the cable, and specifically on the armouring material therein, constitute an important background for the present invention. Thus, there has been a need for a new electric power cable design that would meet the various criteria according to the above, in particular a solution with respect to cable strength and armouring, being also feasible in the case of a retrofit installation of piggybacked cables.

OBJECTS AND SUMMARY

According to one aspect of the invention then, in an electric power cable of the type concerned here, the novel and specific features in the first place consist therein that the armouring means are in the form of tensile strength wire elements being arranged in a central part of the cable-cross section, and more particularly arranged or located centrally within said conductive core. In preferred embodiments of the invention the armouring means are incorporated in the conductive core as integral tensile strength wire elements, such as steel wires. These metal wires are preferably located centrally within the conductive core, and more preferably being fully surrounded by conductive core wire elements, such as copper wire elements.

Further specific features of the electric power cable according to the invention, are comprised by the claims.

Thus in practical terms, the idea behind this invention is to provide for a steel centre core in a traditionally stranded copper conductor. The usual central copper wire or core is, in other words, replaced by preferably high grade steel wires, either of the same wire diameter or a different wire diameter from external copper wire layers in a necessary number outside the integral metal wire core.

In the new design as proposed above, with metal wires as a core strength member inside the conductor elements, substantial advantages are obtained. One advantage consists therein that the strength member is protected against any damage, but perhaps more important, there is no risk of return current flowing through such armouring material, since it will be electrically integral with the copper conductor elements. Moreover such a cable can be installed simultaneously with the pipeline and is also suitable for a retrofit installation.

According to another and important aspect of the invention, there is provided a system for direct electric heating of a hydrocarbon pipeline with an electric submarine power cable installed as a piggyback cable on the pipeline, comprising:
an electric power supply unit,
a supply cable extending from the power supply unit to a point at the pipeline,
an electrical connection between one conductor of said supply cable and the pipeline at said point,
an electrical connection between another conductor of said supply cable and an adjacent end of said power cable near said points, and an electrical connection between a remote end of said power cable and another point on the pipeline,
wherein said power cable has a conductive core with an outer insulation and at lease one protective sheath as well as armouring means in the form of tensile strength wire elements that are arranged in a central part of the cable cross-section, and more particularly the tensile strength wire elements are arranged or located centrally within said conductive core.

Additional specific features of this system according to the invention will be found in dependent claims.

BRIEF DESCRIPTION OF THE DRAWINGS

Referring to the drawings, the invention will be explained further in the form of exemplary embodiments thereof.

DETAILED DESCRIPTION

Figure 1:
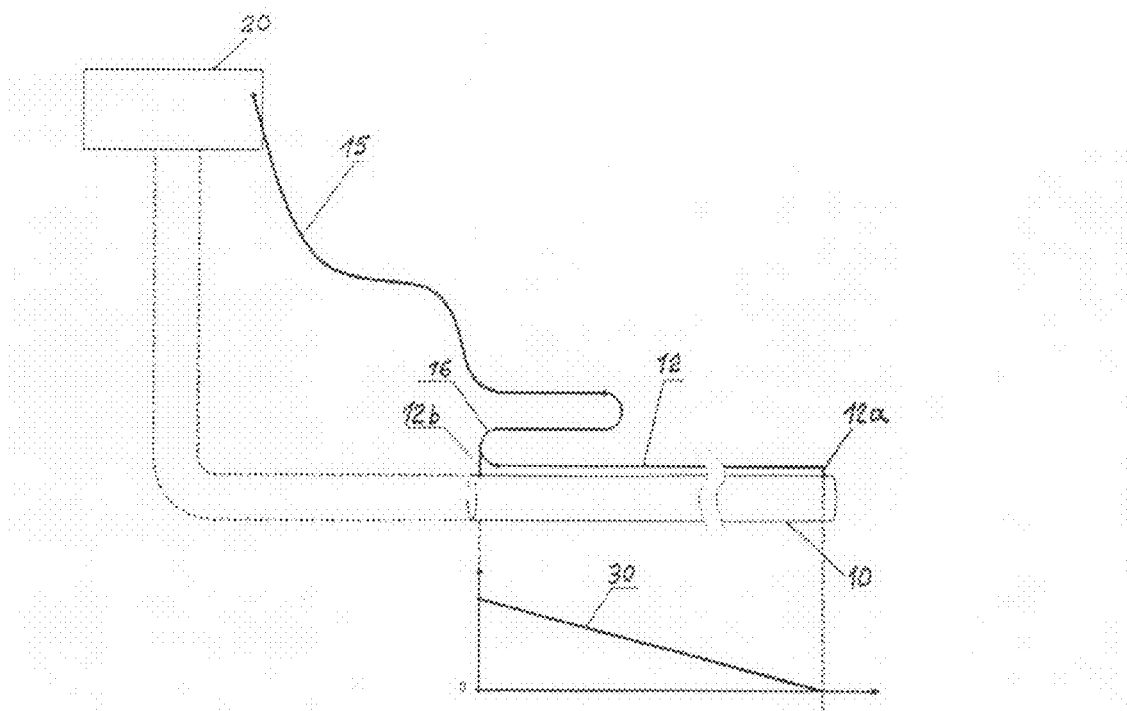
FIG. 1 schematically shows a typical general arrangement for direct heating of a pipeline.

In the arrangement illustrated in FIG. 1 there is a subsea pipeline 10, which may be of considerable length. A piggyback cable 12 is installed along the pipeline 10 or possibly a section thereof. The cable 12 may be of a design as explained below with reference to FIG. 2 of the drawings. At 12a there is shown an electrical connection point between the piggyback cable and the pipeline, for current supply to the latter at this remote end.

An electric power supply unit 20 arranged on a topside structure comprised by the total plant or platform concerned. From unit 20 there is a two-conductor supply cable or riser cable 15 extended down to the subsea installation concerned, where there is provided an armoured feeder cable 16, also being a two-conductor cable or possibly two single-core cables.

One of the feeder cable conductors is connected to the pipeline surface at 12b whereas the other feeder conductor is connected to the first end of the piggyback cable 12—in the 12b area. The remote end of the piggyback cable 12 is—as mentioned—connected to the far/remote end of the pipeline at 12a.

Below the pipeline 10 in FIG. 1 there is a diagram showing a curve 30 representing the piggyback cable voltage with respect to "earth", i.e. the surrounding sea water. Thus, at the remote end 12a of the piggyback cable 12 and the pipeline 10, the curve 30 goes down to zero.

Figure 2:
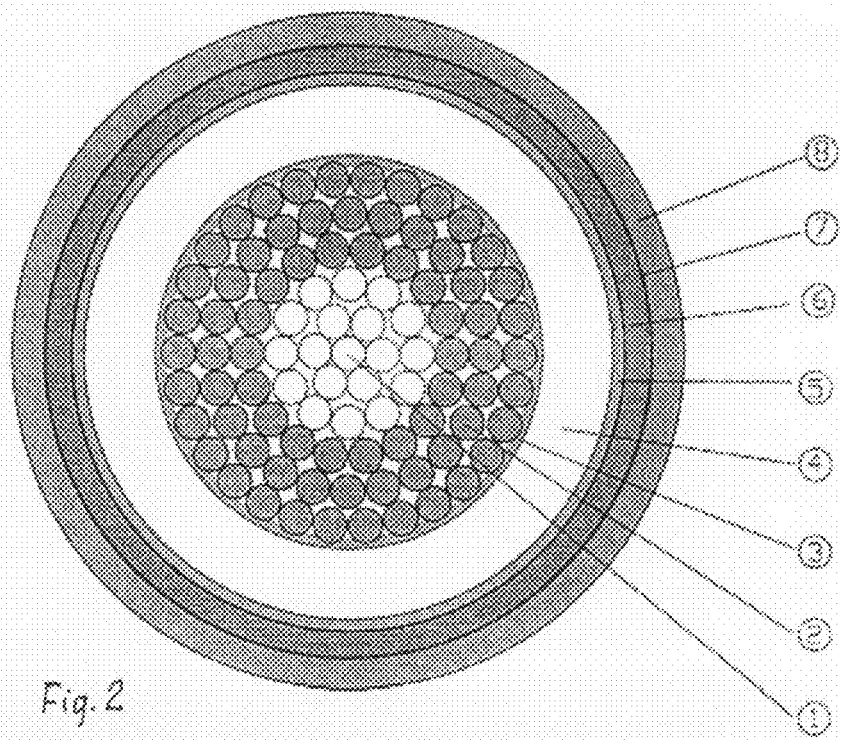
FIG. 2 in cross-sectional view shows an electric power cable designed according to this invention.

The cross-sectional cable structure illustrated in FIG. 2 comprises a central tensile strength member 1 consisting of a number of integral metal wires surrounded by several layers of copper conductors 2 intended to carry the electric current for the particular purpose or consumer concerned. To a quite small and perhaps negligible degree, the central metal wires 1 may also contribute to the current flow. In this case there are three layers of copper conductor elements 2 outside the central wire bundle 1, that preferably consists of a suitable steel material. It may be possible, however, to use a non-metallic material for the tensile strength wire elements in the bundle 1. As an example, Kevlar fiber elements could be used.

At this point it should also be mentioned that the central metal wire elements 1 may have a different distribution within the cross-section, from what is illustrated in FIG. 2. For example, the core bundle may comprise steel wire elements as well as copper wire elements stranded into an integral core member, preferably in such a manner that the steel wires have a symmetrical distribution about the central longitudinal axis of the cable.

As to the number of copper wire layers 2, this may vary from the three layers illustrated in FIG. 2, but less than two layers will usually not be preferred, whereas four or more layers may occur depending on the design criteria, in particular the current carrying capacity and the bending requirements.

The relationship between the cross-sectional areas of the bundle of metal wires 1 and the surrounding bundle of the conductive copper wire core 2, may also vary. Usually, however, the cross-sectional area of the conductive core 2 will be substantially larger than that of the metal wire bundle 1.

Turning now to the layer structure outside the conductor core 2 in FIG. 2, there are more or less conventional layers or components as follow:

A conductor screen layer 3 consisting of a semi-conductive, cross-linked polyethylene.

The main insulation layers 4, usually in the form of a cross-linked polyethylene material.

An insulation screen 5 of a semi-conductive, cross-linked polyethylene.

An inner protective sheath 6 of a semi-conductive polyethylene.

A semi-conductive tape wrapping 7.

An outer protective sheath 8 also of a semi-conductive polyethylene.

The invention claimed is:

1. Electric power cable, in particular for use in hydrocarbon pipeline heating systems and adapted to be installed as a piggyback cable on said pipelines, comprising:

a conductive core made of a plurality of conductive wire elements stranded together, with an outer insulation and at least one protective sheath as well as armouring means, said armouring means being in the form of tensile strength wire elements which are arranged or located centrally within said conductive core, wherein said tensile strength wire elements are integrally incorporated in said conductive core and stranded together with said conductive wire elements.

2. Cable according to claim 1, wherein said tensile strength wire elements are metal wires, preferably in the form of steel wires.

3. Cable according to claim 1, wherein said tensile strength wire elements are fully surrounded by conductive core wire elements, such as copper wire elements.

4. Cable according to claim 1, wherein said tensile strength metal wires and said conductive core elements have cross-sectional dimensions being of the same order of magnitude.

5. Cable according to claim 1, wherein at least two, and preferably three, layers of stranded conductive core wire elements surround said tensile strength metal wires.

6. System for direct electric heating of a hydrocarbon pipeline with an electric power cable installed as a piggyback cable on said pipeline, comprising:

an electric power supply unit, a supply cable extending from the power supply unit to a point at the pipeline, an electrical connection between one conductor of said supply cable and the pipeline at said point, an electrical connection between another conductor of said supply cable and an adjacent end of said power cable near said point, and an electrical connection between a remote end of said power cable and another point on the pipeline, wherein said power cable has a conductive core with an outer insulation and at least one protective sheath as well as armouring means being in the form of tensile strength wire elements which are arranged or located centrally within said conductive core.

7. System according to claim 6, wherein said tensile strength wire element are integrally incorporated in said conductive core, being preferably a multi-wire stranded conductive core.

8. System according to claim 6, wherein said tensile strength wire elements are metal wires, preferably in the form of steel wires.

9. System according to claim 6, wherein said tensile strength wire elements are fully surrounded by conductive core wire elements, such as copper wire elements.

10. System according to claim 6, wherein said tensile strength metal wires and said conductive core elements have cross-sectional dimensions being of the same order of magnitude.

11. System according to claim 6, wherein at least two, and preferably three, layers of stranded conductive core wire elements surround said tensile strength metal wires.

* * * * *